United States Patent

Larsen et al.

[11] 4,003,086
[45] Jan. 11, 1977

[54] DYNAMIC LOOP GAIN ALTERATION FOR DATA RETRIEVAL

[75] Inventors: Tore Langemyr Larsen; Kenneth Holly, both of San Jose, Calif.

[73] Assignee: Memorex Corporation, Santa Clara, Calif.

[22] Filed: Apr. 28, 1975

[21] Appl. No.: 572,518

[52] U.S. Cl. .................................. 360/53; 360/51
[51] Int. Cl.² ........................................ G11B 5/09
[58] Field of Search ............... 360/51, 53, 39, 67, 360/27

[56] References Cited

UNITED STATES PATENTS

| | | | |
|---|---|---|---|
| 3,078,448 | 2/1963 | O'Brien | 360/53 |
| 3,430,215 | 2/1969 | Krossa | 360/67 |
| 3,660,821 | 5/1972 | Weber et al. | 360/67 |
| 3,753,143 | 8/1973 | Aguirre | 360/51 |
| 3,810,234 | 5/1974 | Monett | 360/51 |
| 3,879,674 | 4/1975 | Dragon | 360/67 |
| 3,898,690 | 8/1975 | Desai | 360/51 |

*Primary Examiner*—Jay P. Lucas
*Attorney, Agent, or Firm*—Limbach, Limbach & Sutton

[57] ABSTRACT

A method and apparatus for recovering data stored on a magnetic medium which includes a variable frequency oscillator and a variable frequency oscillator feedback control loop therefor as a part of the data read circuitry, and which includes means for attempting to recover marginally recorded data by increasing the variable frequency oscillator feedback control loop gain during predetermined data read retries.

4 Claims, 6 Drawing Figures

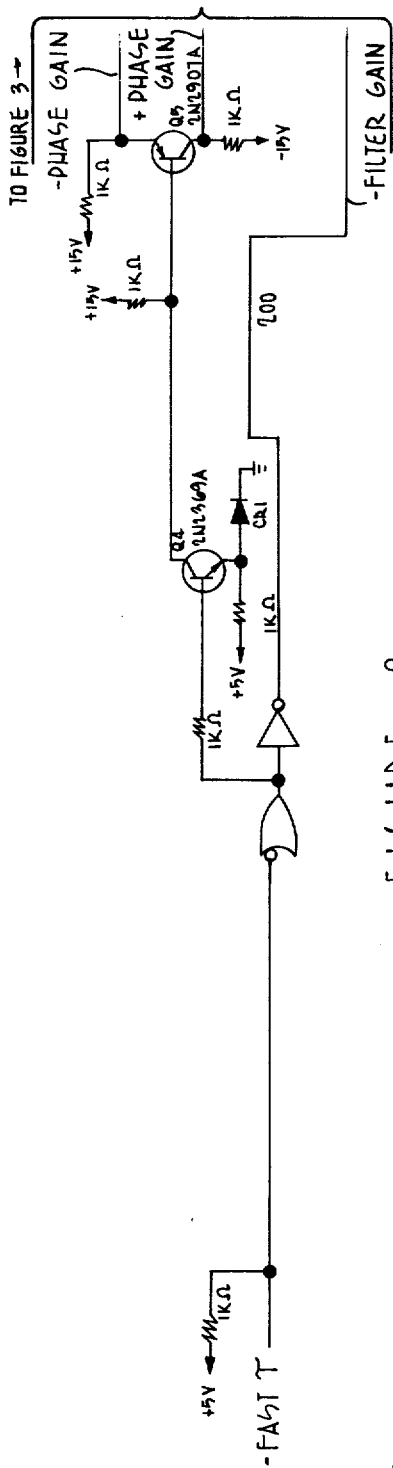
FIGURE 2
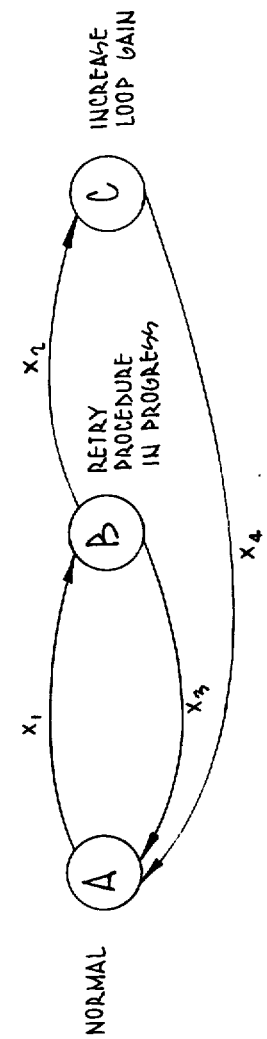
FIGURE 4
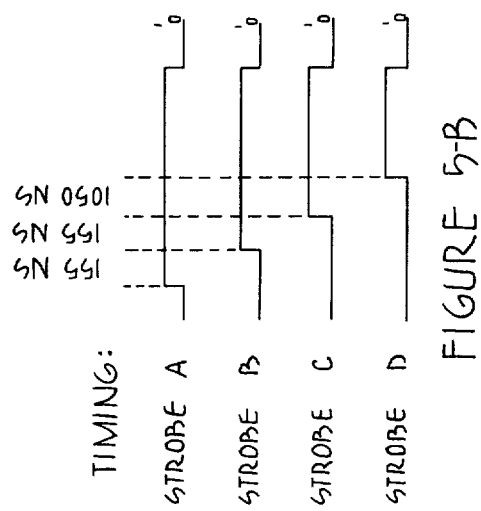
FIGURE 5-B

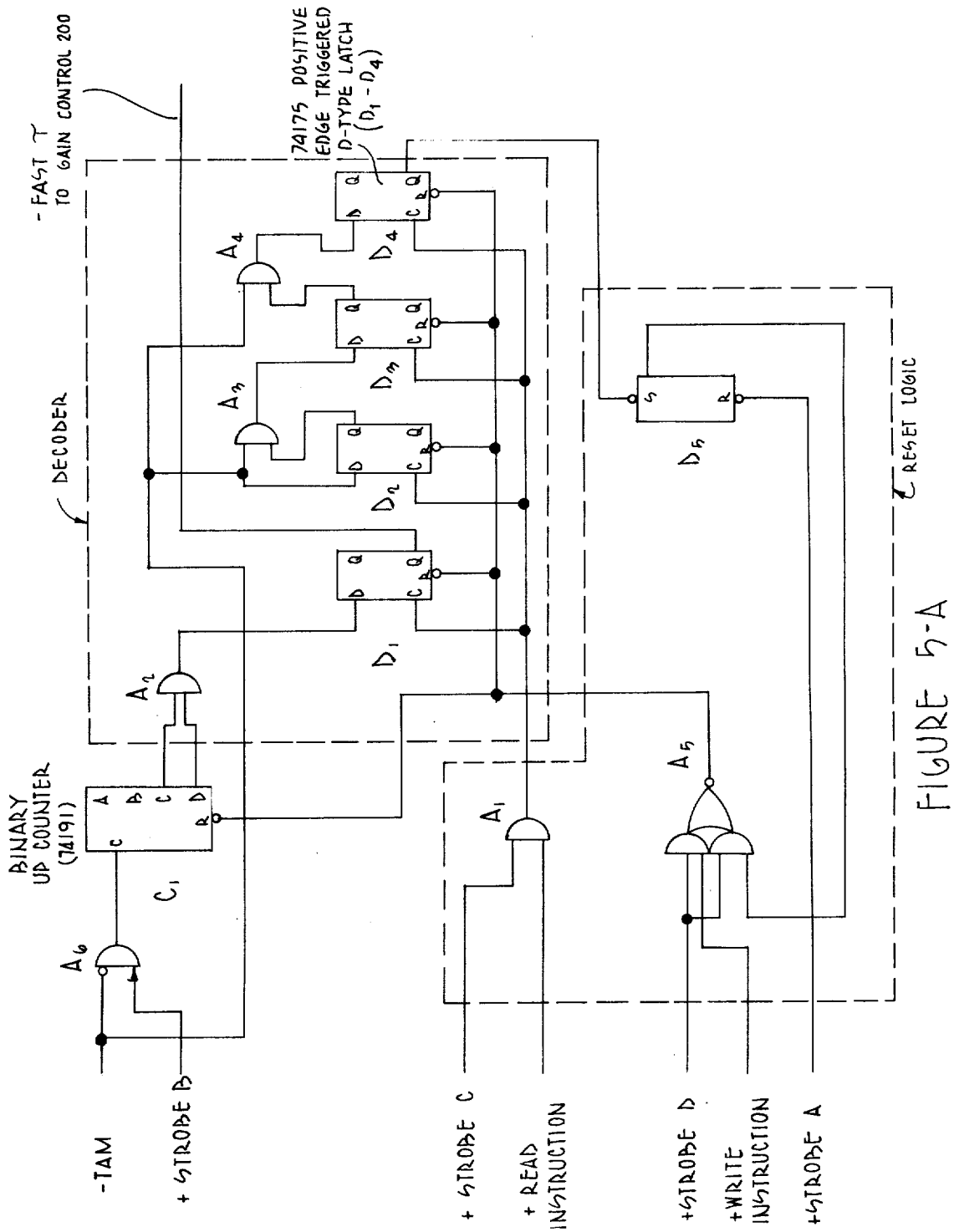
FIGURE 5-A

DYNAMIC LOOP GAIN ALTERATION FOR DATA RETRIEVAL

BACKGROUND OF THE INVENTION

The present invention relates to magnetic recording, and more particularly, the electronic circuitry for decoding data stored on a magnetic medium such as a magnetic disc.

Typical magnetic disc recording systems such as the IBM Model 3330 or the Memorex Model 3670 include a computer driven controller, a disc drive system, a plurality of magnetic recording discs, called a disc pack, and at least one magnetic disc surface having recorded thereon servo or timing signals.

Except during a "read" operation, the timing signals recorded on the servo disc surface are sensed, and a variable frequency oscillator (VFO) is phase-locked through appropriate means such as a phase lock oscillator circuit to the servo signals for supplying clock signals to the controller for write and space count operations. For more details of the operation of such a servo disc system, reference is made to U.S. Pat. No. 3,534,344 by George Santana.

The variable frequency oscillator is locked to the servo data by means of a phase-locked loop/oscillator (PLO). However, during a read operation, the VFO is disconnected from the PLO, and the variable frequency oscillator is locked directly to the raw data which is picked up by a magnetic recording head transducer from a selected magnetic recording disc surface.

By raw data, it is meant that the signals comprise both actual data information signals and, depending upon the particular type of recording code used, timing information signals as well. The nature, frequency, and number of data and timing signals depend upon the type of coding used in the system.

But, regardless of the type of code used in the system, it is the function of the VFO and related circuitry during a read operation to decode the incoming raw digital data by separating the data pulses from the clock pulses. Additionally, the separated data pulses can be relocated in time to remove the effects of bit shift and jitter before being passed to the controller.

For additional information relating to the design and operation of a data-recovery system using a VFO, reference is made to U.S. Pat. No. 3,810,234 to Michael R. Monett.

Though minimized to a high degree, there always exists unavoidable misalignment between the servo disc transducer head and the transducer head used when reading. Consequently, when the VFO is disconnected from the PLO and the raw data from the disc pack is provided to the VFO during a read operation, there will invariably be discrepancies between the phase of the PLO output and the raw data signals. A certain amount of time is required to lock the VFO to the raw data. The amount of time required is determined by the gain of the phase locked loop. During normal operation of the VFO, the loop gain is increased when going from the non-synchronized state to the synchronized state. Specifically, the VFO is synchronized to synchronizing pulses which precede each field of data which form a block of information called a record. This record format will be discussed in greater detail subsequently.

During the transition of locking the VFO to the raw data signals, no data can be accurately read. That is, until the VFO is locked to the raw data signals, it is impossible to decode the data and clock signals. Therefore, it is imperative that this transition time be minimized and VFO be rapidly locked to the raw data signals.

A standard format exists for storing information in magnetic disc file systems. A magnetic disc surface is divided up into "tracks" which comprise a plurality of circular concentric recording bands. A track-accessing mechanism provides minimum time movement of a magnetic transducer head, which functions both in read and write modes, from an existing track at one specified disc radius to another track at a different specified track radius, called for by the disc file controller.

Along each track, information is recorded in the form of blocks of information called records. Within each record are three separate fields which contain data information. These are called the Count, Key, and Data fields. The Count field contains orientation information and the length attributes of the Key and Data fields. The Key and Data fields contain the informational data.

Each field of information recorded on the storage medium, whether a Count, Key, or Data field, has appended to it a 56-bit Error Correction Code (ECC). This code is constructed by performing a mathematical algorithm with the data contained in the field. When a field is retrieved (read), the data in the field and the ECC bits are used as input to another mathematical algorithm and the output of this is examined by the controller to determine if an error has been introduced in the retrieval of the field. At this time, one of three unique situations may exist:

a. No errors have been detected, the information read is correct.

b. An error has been detected but sufficient information can be obtained by mathematical analysis of the residual of the algorithm to determine where (in the field) the error is and what the error is. This is called a correctable error.

c. An error has been detected and sufficient information cannot be obtained by mathematical analysis of the residual of the algorithm to determine where the error exists and/or what the error is.

If situation c) exists, additional attempts are made to read the data. This is accomplished by re-reading the field when it subsequently rotates past the transducer head again. This is called a retry. After a predetermined number of unsuccessful retries, further retries are attempted with the transducer head at positions slightly offset from its normal position in an attempt to read data which may have been recorded slightly off-center. If during any retry, the data error becomes correctable, i.e. situation b) above, then the error is handled as a correctable error and the system exits from the error recovery procedure. If during any retry, the data is read properly, i.e. situation a), the system exits from the error recovery procedure. If the error does not become correctable after all retries of the routine, then it is a non-recoverable error.

Even with the ECC and retry procedure with head offset, some data is not recoverable. One instance where this occurs is where the data has been written by a marginal device, with frequency instability in the write circuitry. Such write devices produce recorded data evidencing the so-called "accordian" effect where the frequency of the data is highly variable. At normal VFO loop gain, there is insufficient time response to recover this data.

SUMMARY OF THE INVENTION

It is therefore an object of the invention to provide an improved data recovery system.

Another object of the invention is to provide a data recovery system capable of recovering recorded data not otherwise recoverable.

Another object of the invention is to provide a data recovery system capable of detecting and reading marginally recorded data.

In accordance with the present invention, means are provided to increase the VFO loop gain during a selected portion of the data recovery procedure in an attempt to recover marginally recorded data. Increasing the loop gain increases the VFO bandwidth and decreases the response time so that marginally recorded data, not otherwise recoverable, is detected and decoded.

The present invention takes advantage of circuitry present in data recovery circuitry which is used to increase the VFO loop gain during the synchronization of the VFO.

In accordance with the present invention, the loop gain is increased during the retry procedure to attempt to pick up marginal data which is not capable of recovery at lower VFO loop gains. While increase loop gain can result in instability and "jitter", the benefits of recovering otherwise unrecoverable data is more than made up for by these consequences.

BRIEF DESCRIPTION OF THE DRAWINGS

FIG. 2 is a detailed schematic diagram of the gain control circuit of FIG. 1.

FIG. 4 is a diagrammatic representation of a procedure for controlling the VFO loop gain in accordance with the present invention.

FIGS. 5A and 5B schematically represent circuitry for carrying out the procedures diagrammed in FIG. 4.

DESCRIPTION OF THE PREFERRED EMBODIMENTS

The dynamic VFO loop gain alteration technique used during the retry procedure of the present invention will be described, for purposes of illustration, as applied to the data recovery circuit described in U.S. Pat. No. 3,810,234 referred to above, which is incorporated by reference herein.

Figure 1:
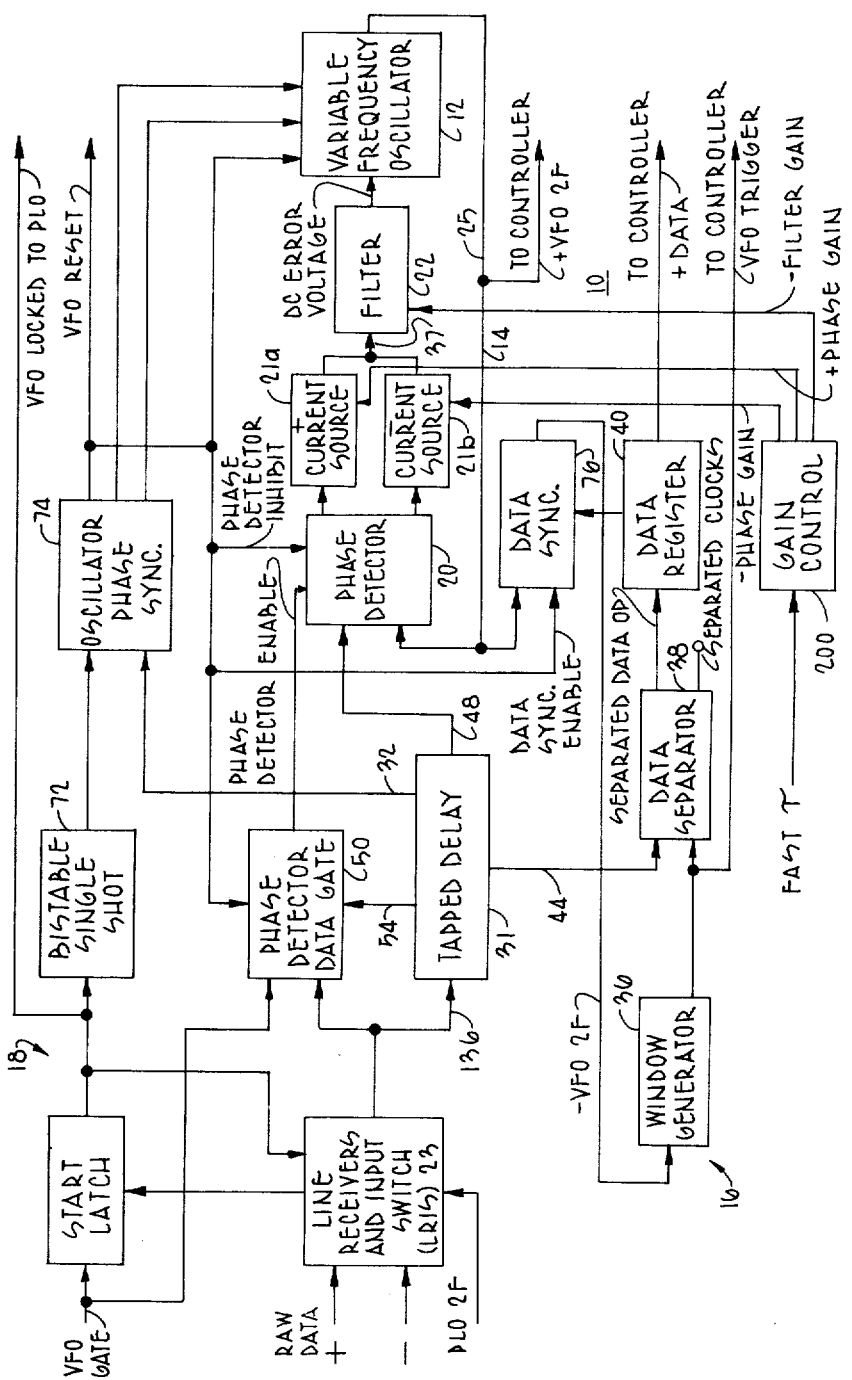
FIG. 1 is a block schematic diagram of a data recovery circuit incorporating the present invention.

FIG. 1 herein is a block diagram illustrating the overall operation of one embodiment of a data recovery circuit 10 of a magnetic disc storage system. Data recovery circuit 10 consists of several subcircuits including a VFO 12, a VFO feedback control loop 14, data separation circuit 16, and a start logic circuit 18. For a further description of the operation of circuit 10 and its subcircuits, reference is made to U.S. Pat. No. 3,810,234, particularly FIGS. 1, 2A and 2B, and 3.

FIG. 1 herein is identical with FIG. 1 of U.S. Pat. No. 3,810,234 incorporated herein with the addition of a gain control circuit 200 for modifying the gain of the VFO feedback control loop 14. FIG. 2 schematically illustrates one embodiment of a gain control 200.

There are three output signals from gain control 200: + phase gain, − phase gain, and − filter gain. These three signals go, respectively, to + current source 21a, − current source 21b, and filter 22 for regulating the gain of VFO feedback control loop 14.

Figure 3:
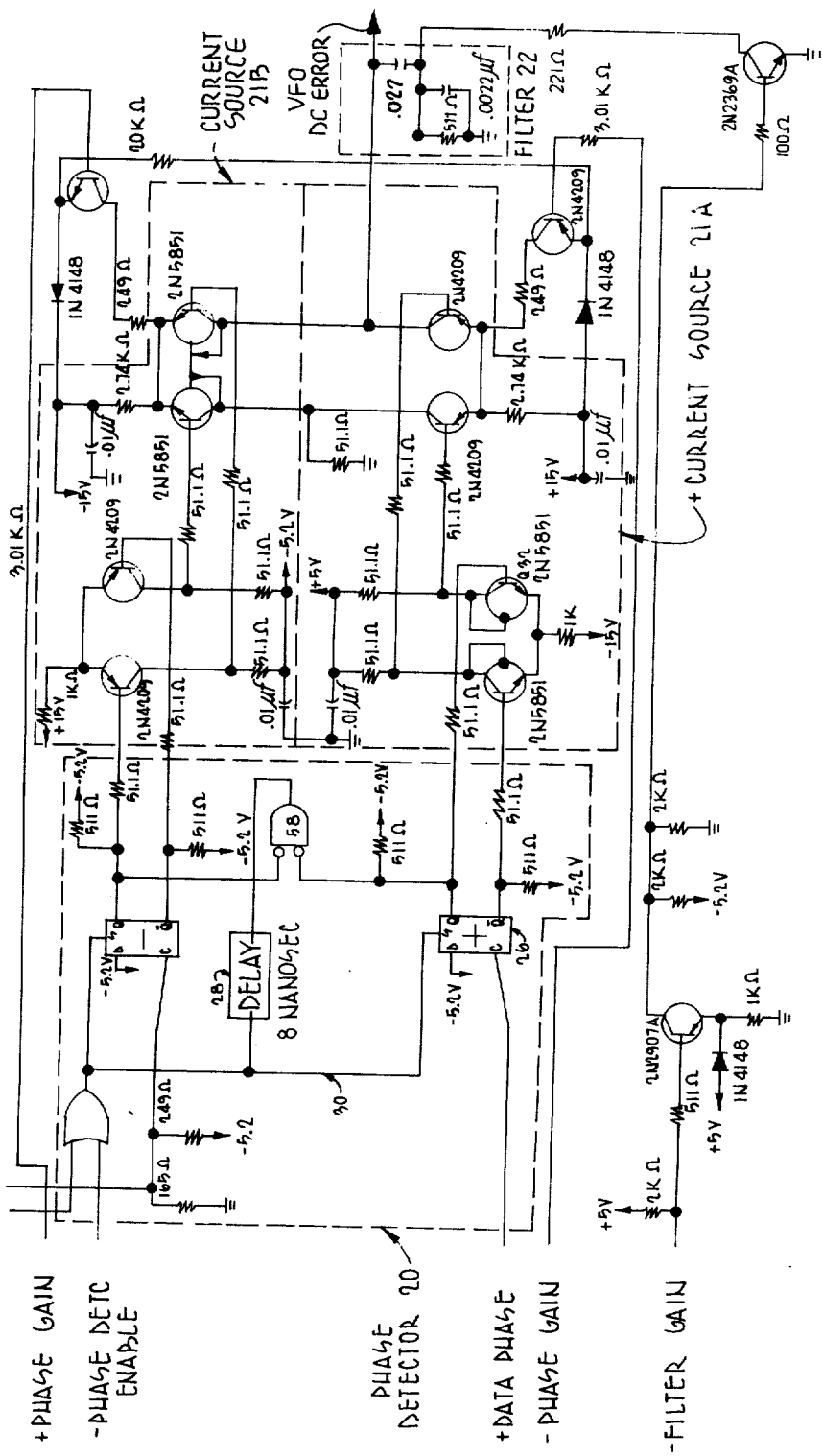
FIG. 3 is a detailed schematic diagram of the phase detector, current sources, filter, and circuitry relating to the gain control of FIG. 1.

FIG. 3 is a detailed schematic illustrating one embodiment of phase detector 20, current sources 21a and 21b, filter 22 and elements associated with the gain control 200. The diagram of phase detector 20, current sources 21a and 21b, and filter 22 are identical with those shown in FIG. 2B of U.S. Pat. No. 3,810,234 incorporated herein. The remaining circuitry, associated with the gain control 200, does not appear in FIG. 2B of U.S. Pat. No. 3,810,234.

As previously explained, in the event data from any Count, Key or Data field is not correctly read, or does not become correctable under ECC, the retry procedure is used. This simply means that the data is re-read during subsequent revolutions of the disc past the transducer head, first with the head at the null or center point of the track and then in various offset positions. In one actual error recovery procedure, the number of retries and the position of the head is as follows:

| Retry No. | Head Offset Position in Microinches |
|---|---|
| 1 | 0 |
| 2 | 0 |
| 3 | 0 |
| 4 | 0 |
| 5 | 0 |
| 6 | 0 |
| 7 | 0 |
| 8 | 0 |
| 9 | 0 |
| 10 | 0 |
| 11 | 0 |
| 12 | 0 |
| 13 | 0 |
| 14 | 0 |
| 15 | 0 |
| 16 | −400 |
| 17 | −400 |
| 18 | +400 |
| 19 | +400 |
| 20 | −800 |
| 21 | −800 |
| 22 | +800 |
| 23 | +800 |
| 24 | −1200 |
| 25 | −1200 |
| 26 | +1200 |
| 27 | +1200 |

If an error is introduced while reading any one of the fields of a record, the error recovery procedure above is invoked. The recovery procedure reorients the transducer head to the Count field of the record in error using a "Read Instruction, Timed Address Mark Search" (TAM) instruction. The Address Mark (AM) is a blank, D.C.-erased 3-byte space which proceeds only the Count field of a record. By knowing where the incorrectly read record physically exists on the track it is possible to reach the incorrectly read record. Read instruction, TAM, is used only by the retry procedure and not during normal processing. Thus, the TAM's provide a unique way of identifying the fact that the retry procedure is in progress.

The TAM instruction causes the Count field to be read; then the recovery procedure issues read instructions, to read the Key and Data fields. The error recovery procedure performs the sequence of TAM, Read, Read a maximum total of 27 times before the error is called permanent, if no successful passes are made.

In accordance with the present invention the VFO loop gain is temporarily increased during a part of the retry procedure in attempt to recover marginally-recorded data. While increasing the loop gain increases somewhat the instability of the VFO feedback loop, it also decreases the response time and increases the bandwidth of the VFO feedback loop. Consequently, it is possible to recover data which is not recoverable at a lower loop gain. This is accomplished without resort to permanently running at a high VFO loop gain, which could result in unacceptable levels of jitter and instabilities which can contribute to steady state error in the system.

The dynamic loop gain alteration technique of the present invention follows a sequence for controlling the VFO loop gain as a function of the retry procedure as shown in FIG. 4.

Three states, A, B, and C, describe the states of the VFO feedback loop gain control function. Condition $X_1$ brings the function from state A to state B, $X_2$ from B to C, $X_3$ from B to A, and $X_4$ from C to A. State A is the normal state for the loop-gain procedure. That is, the VFO loop gain is at its normal value. State B signals that a TAM instruction has been detected, i.e. the retry procedure is in progress. When in state C, the loop gain of the phase locked loop is increased, for the duration of state C. In one actual embodiment, the loop gain increases by a factor of 12.

The state transfer vehicles or conditions are defined as follows:

$X_1$ = Detection of a TAM instruction.

$X_2$ = Detection of eleven successive TAM instructions with no more than two Read instructions between any two TAM's. This indicates that the eleven retries were all unsuccessful. If more than two Read instructions are given between TAM's then it must mean that there was a successful read, since this means that more than the following Key and Data Fields have been read.

$X_3$ = Any write instruction, or more than two consecutive read instructions. This indicates that a retry was successful in reading data.

$X_4$ = Detection of more than 15 TAM instructions, or more than two consecutive Read instructions, or any write instruction.

From the foregoing, it is apparent that the first eleven retries will be carried out in the usual way. If one is successful, then nothing further happens with respect to the loop gain alteration of this invention and the system returns to state A. At the twelfth retry, however, the system goes to state C and the VFO loop gain is increased in accordance with the present invention. It is also increased during the 13th, 14th and 15th retries, if required. If none of the 12–15 retries is successful, then the remainder of the retry procedure is invoked, with head offsetting. Note that after retry 15, the model shown in FIG. 4 and described on page 11 will enter the normal state (State A) even though retry may still be in progress. At retry 17, the model will enter State B again, but because the retry procedure ends at count 27, the model will not again enter State C. This phenomenon also can be varified by examination of the schematic diagram of FIG. 5A. If the model is left in State B as a result of exhausting the number of retries, normal operation of the controller, causes the model to return to State A via the $X_3$ path. The procedure diagrammed in FIG. 4 assumes that retry procedure is terminated by detecting more than two consecutive read instructions since the Key and Data fields only should be processed before the next TAM. The gain of the loop is immediately decreased, i.e. returned to normal, when the model assumes that the retry procedure is terminated.

The particular choice of retry numbers selected for the high gain procedure is a matter of design choice and the invention should not be limited to the particular retry numbers described herein.

The actual implementation of the procedure diagrammed in FIG. 4 will now be explained. When the loop gain control function is in state C a signal called "fast $\tau$" goes from a high to a low or active state. As indicated in FIG. 1, it is this signal which causes the gain control 200 to alter the VFO loop gain. More particularly when fast $\tau$ is low (active) the gain control 200 alters the characteristics of the current sources $21a$ and $21b$ and the filter 22 to increase the loop gain.

A circuit 210 is shown in FIG. 5A for providing an activated fast $\tau$ signal in accordance with the sequence dictated in FIG. 4. During normal operation, no TAM instructions are received, hence counter $C_1$ is not incremented but stays in the zero state, corresponding to state A in FIG. 4. Once a TAM instruction is received, the counter $C_1$ is incremented and the function is now in state B. The next 11 TAM instructions increment the counter $C_1$ to a value of 12 at which time latch $D_1$ is set to activate the fast $\tau$ signal.

Latches $D_2$, $D_3$ and $D_4$ are used to count any intervening (between successive TAM's) read instructions, other than TAM. If three intervening reads are counted, the counter C and the fast $\tau$ signal from $D_1$ are reset through latch $D_5$ and gate $A_5$. If a write instruction is received, the counter $C_1$ and the latch $D_1$ are reset through gate $A_5$. Gate $A_2$ assures that the latch $D_1$ is only activated to provide a fast $\tau$ signal from counts 12 through 15, inclusive.

Referring to FIG. 5B, the strobe signals A, B, C and D are shown for clarity. They compensate for differences in propagation delays of the circuits utilized.

What is claimed is:

1. A data recovery system comprising:
 a. at least one rotating magnetic disc;
 b. means for positioning a magnetic transducer head adjacent a desired track on said disc;
 c. means for reading data recorded thereon, said means including a variable frequency oscillator and a variable frequency oscillator feedback control loop; and
 d. means for attempting to recover recorded data after a predetermined number of unsuccessful retry attempts to read data comprising means for increasing the variable frequency oscillator loop gain for up to a predetermined number of retries, whereby the variable frequency oscillator has decreased response time and increased bandwidth to thereby read marginally recorded data.

2. A data recovery system comprising:
 a. a magnetic recording medium;
 b. means for positioning a magnetic transducer head adjacent a desired position on said recording medium;
 c. means for reading data recorded thereon; said means including a variable frequency oscillator and a variable frequency oscillator feedback control loop;

d. means for re-reading data recorded at a particular position on said recording medium; and e. means for attempting to recover recorded data after a predetermined number of unsuccessful retry attempts to read data comprising means for increasing the variable frequency oscillator loop gain for up to a predetermined number of retries, whereby the variable frequency oscillator has decreased response time and increased bandwidth to thereby read marginally recorded data.

3. In a data recovery system including a variable frequency oscillator, a variable frequency oscillator feedback control loop therefor and means for re-reading data which has been incorrectly read, improved means for attempting to recover marginally recorded data comprising means for increasing the feedback control loop gain during predetermined data read retries, thereby decreasing the response time and increasing the bandwidth of said variable frequency oscillator.

4. In a data recovery system including a variable frequency oscillator, a variable frequency oscillator feedback control loop therefor and means for re-reading data which has been incorrectly read, an improved method of attempting to recover marginally recorded data comprising the step of increasing the feedback control loop gain during predetermined data read retries, thereby decreasing the response time and increasing the bandwidth of the variable frequency oscillator.

* * * * *